United States Patent
Kuhm et al.

(10) Patent No.: US 8,939,690 B2
(45) Date of Patent: Jan. 27, 2015

(54) ATTACHMENT DEVICE FOR FIXING ON A PLATE HAVING A HOLE AND ASSEMBLY COMPRISING SUCH AN ATTACHMENT DEVICE

(75) Inventors: Michel Kuhm, Ingwiller (FR);
Jean-Luc Klein, Ringerdorf (FR);
Dominique Duchet, Cauvigny (FR);
Frédéric Lard, Saint Martin le Noeud (FR)

(73) Assignee: Faurecia Interieur Industrie, Nanterre (FR)

( * ) Notice: Subject to any disclaimer, the term of this patent is extended or adjusted under 35 U.S.C. 154(b) by 92 days.

(21) Appl. No.: 13/557,677

(22) Filed: Jul. 25, 2012

(65) Prior Publication Data

US 2013/0101370 A1 Apr. 25, 2013

(30) Foreign Application Priority Data

Jul. 25, 2011 (EP) ..................................... 11175258

(51) Int. Cl.
*F16B 37/04* (2006.01)
*F16B 41/00* (2006.01)
*F16B 37/00* (2006.01)

(52) U.S. Cl.
CPC ............. *F16B 41/002* (2013.01); *F16B 37/043* (2013.01); *F16B 37/005* (2013.01)
USPC ............................................. 411/182; 411/34

(58) Field of Classification Search
USPC .................................. 411/182, 55, 34, 37, 38
See application file for complete search history.

(56) References Cited

U.S. PATENT DOCUMENTS

| 3,143,916 | A | * | 8/1964 | Rice ................................. 411/37 |
| 3,313,083 | A | * | 4/1967 | Flora .......................... 52/718.02 |
| 3,601,869 | A | * | 8/1971 | Flora et al. .................... 411/548 |
| 4,082,030 | A | | 4/1978 | Erickson |
| 4,089,248 | A | * | 5/1978 | Anscher .......................... 411/38 |
| 4,284,378 | A | * | 8/1981 | Mizusawa ....................... 411/21 |
| 4,407,618 | A | * | 10/1983 | Kimura ........................... 411/40 |
| 5,078,561 | A | * | 1/1992 | Wollar et al. .................... 411/38 |
| 5,173,025 | A | * | 12/1992 | Asami .......................... 411/344 |
| 5,401,132 | A | * | 3/1995 | Akema .......................... 411/38 |
| 6,560,819 | B2 | * | 5/2003 | Mizuno et al. ................... 16/2.2 |
| 7,014,405 | B2 | * | 3/2006 | Behle et al. ..................... 411/21 |

FOREIGN PATENT DOCUMENTS

EP 1367271 12/2003
FR 2861818 5/2005

OTHER PUBLICATIONS

European Search Report for application No. EP 11175258.0, dated Nov. 23, 2011, 5 pages.

* cited by examiner

*Primary Examiner* — Flemming Saether
(74) *Attorney, Agent, or Firm* — Reising Ethington P.C.

(57) ABSTRACT

An attachment device having a nut member, flange member, and tabs connecting the flange member to the nut member. The nut member extends along an axis and has an axial thread-engaging bore. The flange member extends transversely to the axis and has an opening, with the flange member being spaced axially from nut member. The tabs connect the flange member to the nut member, with each tab having a first end connected to the nut member and a second end connected to the flange. The nut member includes blocks having abutment faces defining a polygonal outline with side faces, with each tab extending alongside an abutment face on a side face.

19 Claims, 3 Drawing Sheets

ATTACHMENT DEVICE FOR FIXING ON A PLATE HAVING A HOLE AND ASSEMBLY COMPRISING SUCH AN ATTACHMENT DEVICE

TECHNICAL FIELD

The present invention relates to attachment devices used for coupling together vehicle parts such as a trim part and trim support part.

BACKGROUND

An attachment device of this type is disclosed in EP 1 367 271.

Such an attachment device is adapted for insertion into a hole provided though a first plate, the attachment device being held captive into the hole, and for engagement of a threaded shank into the bore of the attachment device for connecting the first plate to a second plate.

In the field of automotive vehicles, such attachment devices, generally named "grommets", are used for coupling vehicle parts such as a trim part and trim support part.

It is desired to have an attachment device which is reliable and can be manufactured at low cost while being convenient in use.

SUMMARY

An aim of the invention is to provide an attachment device which is reliable and can be manufactured at low cost while being convenient in use.

To this end and in accordance with one embodiment of the invention, there is provided an attachment device that includes: a nut member extending along an axis and having an axial thread-engaging bore; a flange member extending transversely to the axis and having an opening, the flange member being spaced axially from nut member; and tabs connecting the flange member to the nut member, each tab having a first end connected to the nut member and a second end connected to the flange, wherein the nut member includes blocks having abutment faces defining a polygonal outline with side faces, each tab extending alongside an abutment face on a side face.

In other embodiments, the attachment device comprises one or several of the following features, taken in isolation or in any technically feasible combination:
  a tab on each side face;
  the abutment faces define a square outline with four side faces;
  each tab is accommodated in a cavity defined in a side face;
  each block has a lateral face facing a tab, said lateral face having a recess;
  a gap between an axial end of a body of the nut member having the bore extending therein, each block having a protrusion protruding axially towards the flange member beyond the axial end of the body, the abutment face of the block extending on said protrusion;
  the bore has a length for accommodating a threaded shank of a screw screwed in the nut member through the opening of the flange member without the threaded shank protruding from the axial end of the nut member opposite the flange member;
  each tab has a toothed front face facing outwardly;
  each tab comprises teeth of increasing height along the tab;
There is also provided an assembly that includes a plate comprising a hole and an attachment device as described in any of the embodiments above, which is inserted and held captive into the hole, the hole having a section corresponding to the polygonal outline defined by the abutment faces of the blocks.

BRIEF DESCRIPTION OF THE DRAWINGS

The present invention and its advantages will be better understood on reading the following description which is given solely by way of example and with reference to the appended drawings, in which.

DETAILED DESCRIPTION OF THE ILLUSTRATED EMBODIMENT(S)

Figure 1:
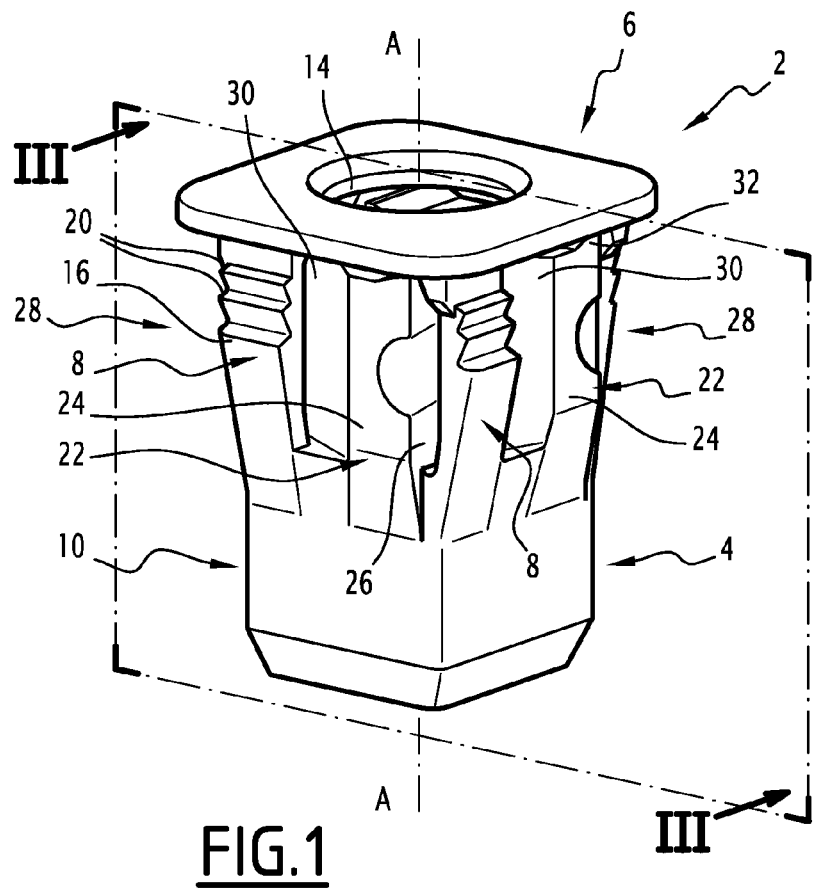
FIG. 1 is a perspective view of an attachment device according to the invention.

As illustrated on FIGS. 1-4, the attachment device 2 comprises a nut member 4 extending along an axis A-A, a plate-shaped axial abutment flange member 6 extending transversely to the axis A-A and tabs 8 connecting the nut member 4 to the flange member 6.

The attachment device 2 is for insertion of the nut member 4 into a hole extending though a plate with the flange member 6 axially abutting the plate and the tabs 8 axially engaging the underside of the plate to hold the attachment device captive in the hole.

The attachment device 2 is molded in one piece. The nut member 4, the flange 6 and the tabs are made in one piece of material. The attachment device 2 is made in plastic material, for example in polyamide (PA), namely PA66.

The nut member 4 comprises a hollow body 10 extending along the axis A-A and a thread-engaging bore 12 (FIG. 3) extending within the body 10 along axis A-A. The bore 12 is a through bore and opens at both axial ends of the body 10. The bore 12 has a smooth internal surface. The bore 12 is adapted such that a threaded shank forms an internal thread on the internal surface of the bore 12 at first screwing.

The flange member 6 is spaced from the body 10 along axis A-A. The flange member 6 comprises an opening 14 coaxial to the bore 12. The opening 14 has a diameter greater than that of the bore 12. The flange member 6 has a lower face facing the body 10 and an opposed upper face facing opposite the body 10.

The tabs 8 connect the body 10 to the flange member 6. Each tab 8 is elongated axially along axis A-A. Each tab 8 has a first end connected to the body 10 and a second end connected to the flange member 6. The tabs 8 are distributed around the body 10.

The first end of each tab 8 is connected to a side surface of the body 10 remote from the axial end of the body adjacent to the flange member 6. The second end of each tab 8 is connected to the lower face of the flange member 6.

Each tab 8 has a front face 16 facing outwardly and an opposite rear face 18 facing inwardly.

The front face 16 of each tab 8 is toothed. The front face 16 of each tab comprises a plurality of teeth 20 distributed axially along the tab 8. The teeth 20 have a varying height along the tab 8, more specifically an increasing height along the tab 8 from the second end of the tab 8 connected to the flange member 6 towards the first end of the tab 8 connected to the body 10.

The nut member 4 comprises blocks 22. Each block 22 extends axially and has an abutment face 24 and a lateral face 26. The blocks 22 protrude radially outwardly from the body 10 between the tabs 8.

Figure 4:
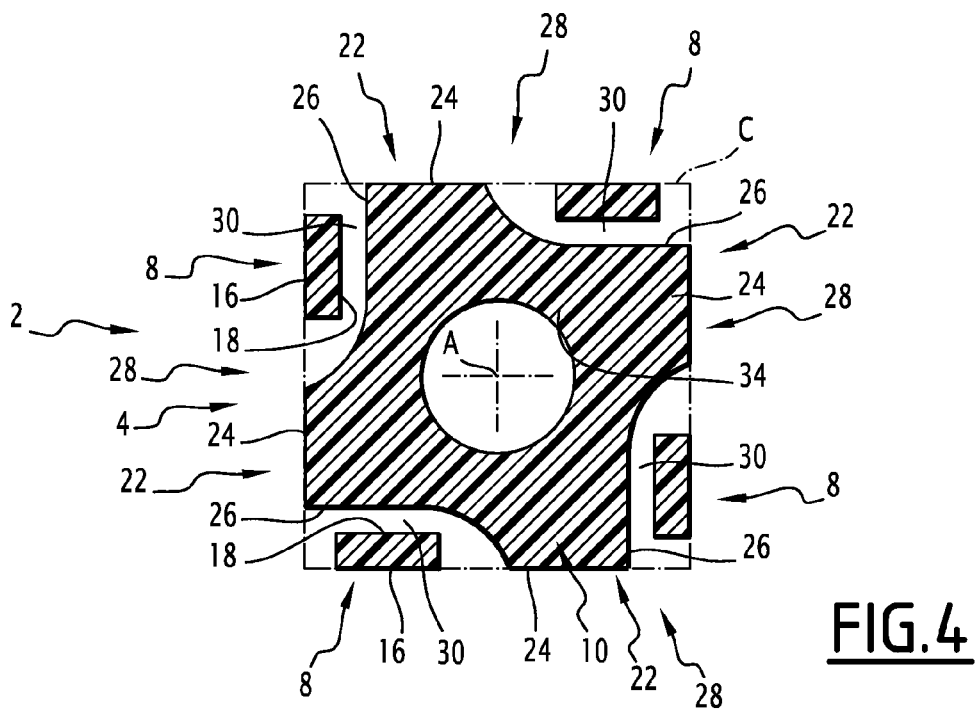
FIG. 4 is a sectional top view of the attachment device along IV-IV on FIG. 2.

As better seen on FIG. 4, the abutment faces 24 of the blocks 22 are planar and define in section in a plane perpendicular to axis A-A a polygonal outline C with planar side faces 28. The attachment device 2 has here four blocks 22 and the polygonal outline C is a square outline.

The blocks 22 are anti-rotation members configured for preventing rotation of the attachment device 2 in the hole. The blocks 22 are configured for their abutment faces 24 to abut the inner wall of a hole in which the attachment device 2 is inserted for preventing rotation of the attachment device 2.

The lateral face 26 of each block 22 of a side face 28 faces towards the rear face 18 of a tab 8 of another side face 28.

The blocks 22 define between them cavities 30 on the side faces 28. Each cavity 30 extends axially. Each cavity is located at the corners of the polygonal outline C. Each cavity 30 opens on the corresponding side face and also on the adjacent side face 28 defining the corresponding corner. The blocks 22 impart to the nut member 4 a cross shaped cross-section with four branches.

Each block 22 is offset laterally with respect to the radial axis which is normal to the abutment face 28 of the block 22 and radial with respect to the axis A-A. Each cavity 30 has a large opening on the corresponding side face 28 and a small opening on the other side face 28 defining the corresponding corner with the corresponding side face 28.

Each tab 8 is positioned on a respective side face 28 extending along said side face 28. Each tab 8 extends alongside the abutment face 24 defining the corresponding side face 28. Each tab 8 is accommodated in a respective cavity 30. The front face 16 of each tab 8 is substantially parallel to the abutment face 24 defining the side face 28. The plan of the side face 28 extends within the thickness of the tab 8, between the front face 16 and the rear face 18 of the tab 8. Each tab 8 is at a corner of the polygonal outline C.

Figure 2:
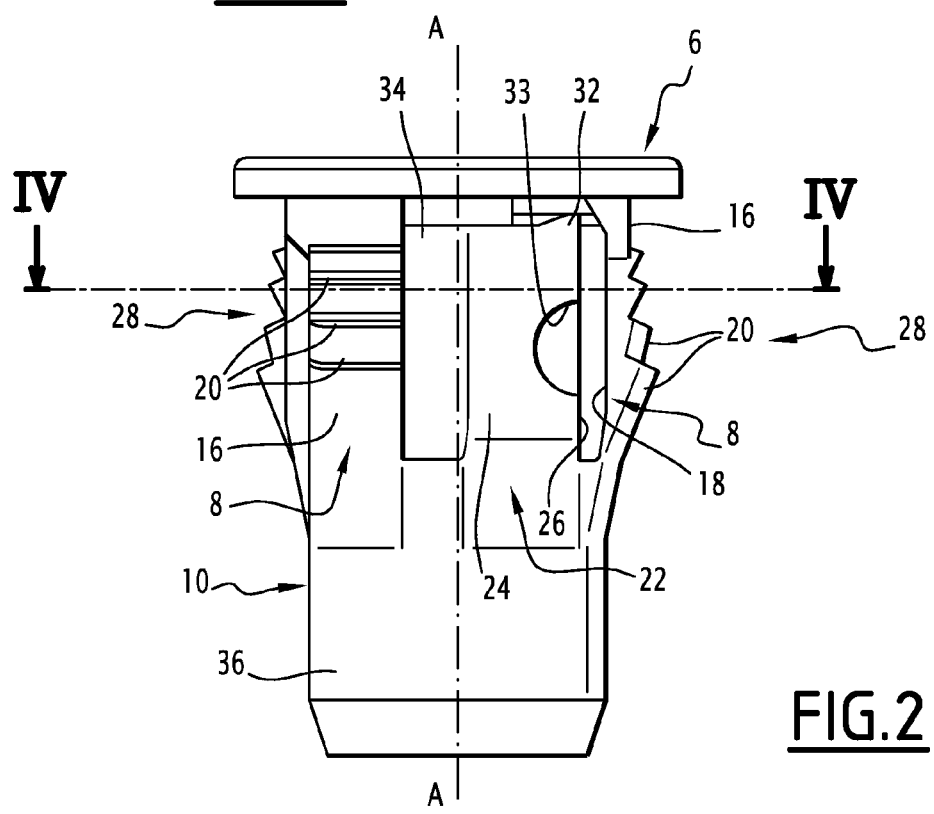
FIG. 2 is a side view of the attachment device.
Figure 3:
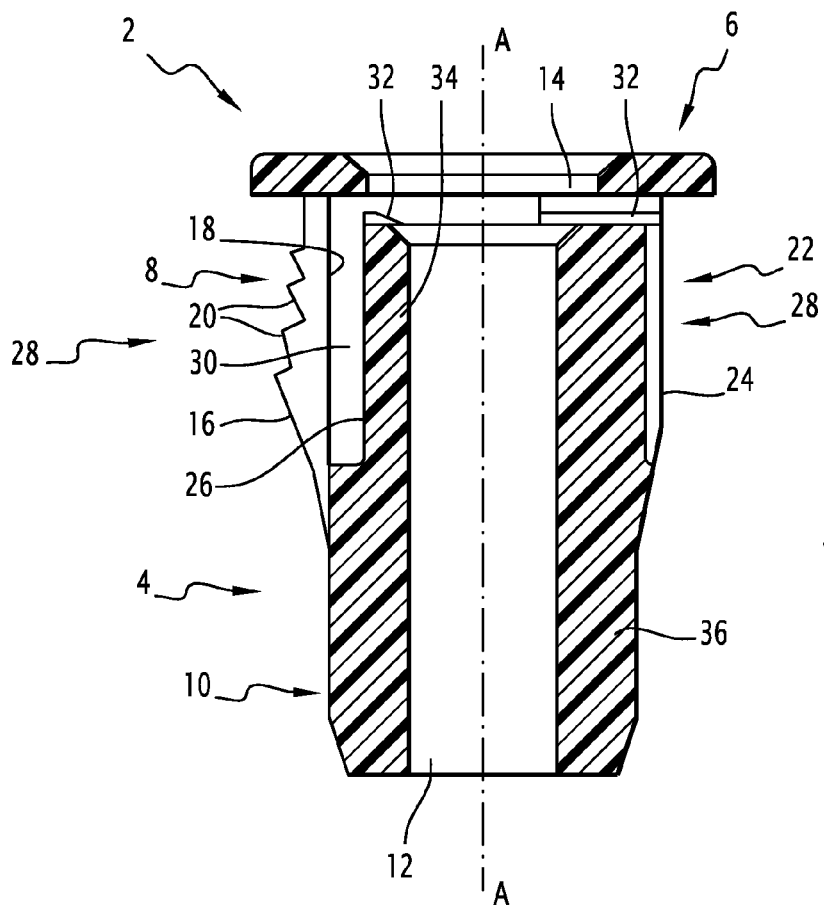
FIG. 3 is a sectional side view of the attachment device along III-III on FIG. 1.

As illustrated on FIGS. 2 and 4, the attachment device 2 comprises on each side face 28 of the polygonal outline C one single tab 8 and one single block 22, the tab 8 and the block 22 extending alongside.

Each tab 8 is offset laterally towards one of the two corners of the polygonal outline C delimiting the side face 28 and the block 22 is offset laterally towards the other one of the two corners of the polygonal outline C delimiting the side face 28. The tab 8 and the block 22 of each side face 28 are provided on either sides of a centerline of the side face 28 parallel to the axis A-A.

The attachment device 2 comprises an axial gap between the axial proximal end of the body 10 adjacent to the flange 6 and the lower face of the flange 6.

Each block 22 is integral with the nut member 4 and spaced axially from the flange member 6.

Each block 22 comprises a projection 32 extending the block 22 beyond the axial proximal end of the body 10. The abutment face 24 extends on the projection 32. The projection 32 is provided in the corner of the block 22 at the junction of the abutment face 24 and the lateral face 26 of the block 22. The projection 32 is in the form of a prong.

Each block 22 is provided with a recess 33 in its lateral face 26 facing the rear face 18 of a tab 8. The recess 33 opens on the abutment face 24 of the corresponding block 22. The recess 33 has a depth decreasing from the abutment face 24. The recess 33 locally enlarges the gap between the lateral face 26 of a block 22 and the facing rear face 18 of a tab 8.

The body 10 has a proximal section 34 adjacent the flange member 6 and a distal section 36 remote the flange member 6. The distal section 36 extends the proximal section 34 axially. The second ends of the tabs 8 are connected to the body 10 at the junction between the proximal section 34 and the distal section 36.

The tabs 8 are distributed around the proximal section 34 and the blocks 22 protrude radially outwardly from the proximal section 34 between the tabs 8.

The distal section 36 has a polygonal outline corresponding to that of the polygonal outline C defined by the blocks 22, but with slightly smaller dimensions.

The distal section 36 is provided with sufficient length to accommodate the threaded shank of a screw. This prevents the screw from protruding from the body 10.

Figure 5:
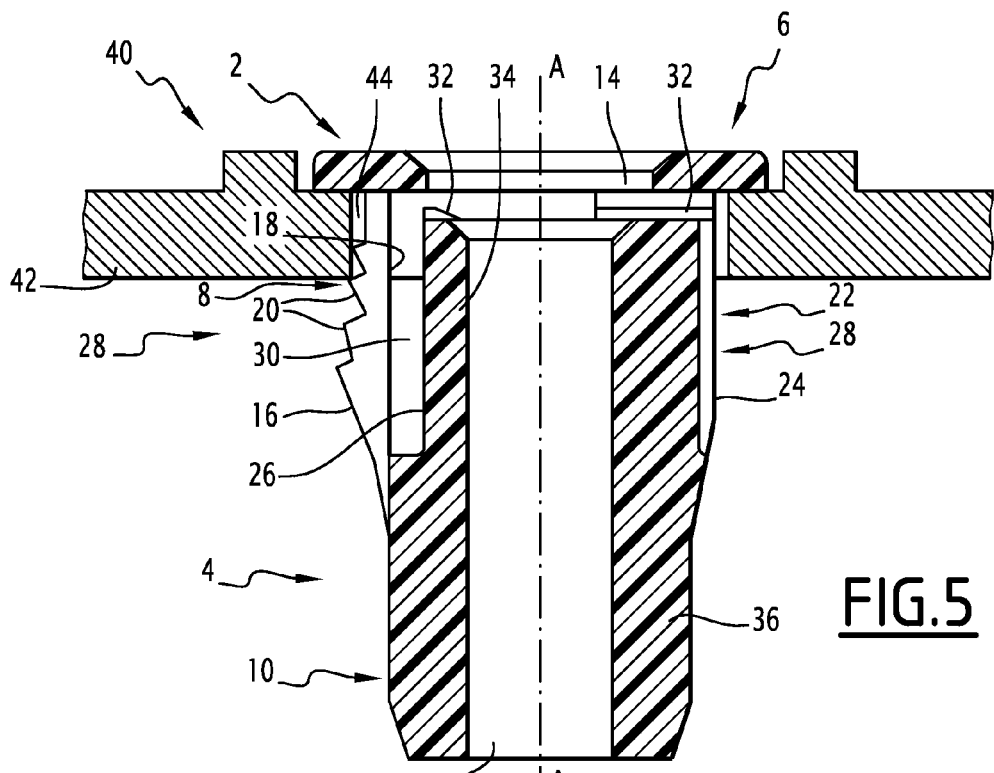
FIG. 5 is a sectional side view of an assembly comprising a plate and the attachment device inserted through a hole in the plate before screwing a screw.

As illustrated on FIG. 5, an assembly 40 comprises a first plate 42 having a first hole 44 extending through the first plate 42 and the attachment device 2 inserted into the hole 44 and captive on the first plate 42.

The nut member 4 extends through the hole 44 and the flange member 6 axially abuts the periphery of the hole 44 and prevents further insertion of the attachment device 2 in a first axial direction. The teeth 20 of the tabs 8 engage the edge of the first hole 44 on the underside of the first plate 42 and prevent unintentional removal of the attachment device 2 in a second axial direction opposite the first axial direction.

The first hole 44 has a cross section corresponding to the polygonal outline C defined by the blocks 22. The abutment faces 24 of the blocks 22 prevent rotation of the attachment device 2 with respect to the first hole 44. In case a torque is applied onto the attachment device 2, the abutment faces 24 abut the inner wall of the first hole 44 thus preventing rotation.

The tabs 8 accommodated in the cavities 30 defined in the side faces 28 between the blocks 22 are prevented from being cut onto the edge of the first hole 44 due to a rotation of the attachment device 2, especially when the first plate 42 is a thin metal sheet with generally cutting edges.

Figure 6:
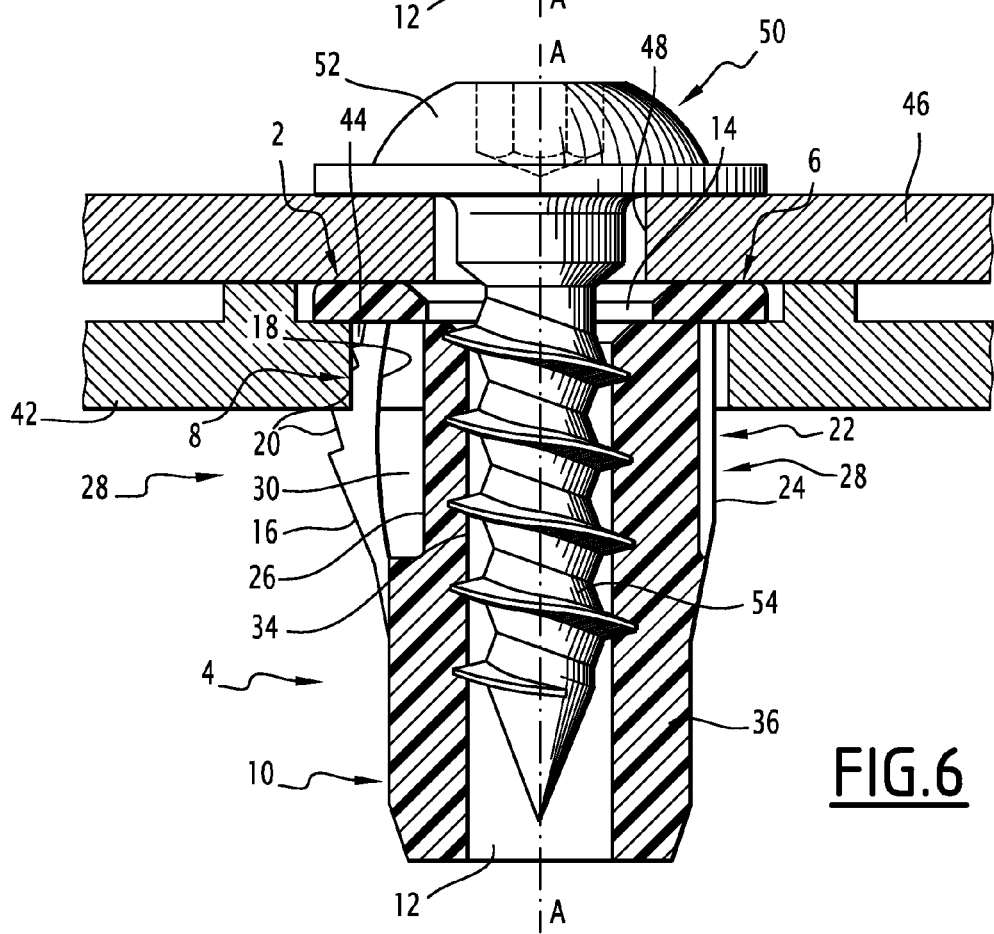
FIG. 6 is a sectional side view of the assembly of FIG. 5, after screwing a screw.

As illustrated on FIG. 6, a second plate 46 having a second hole 48 is laid upon the first plate 42 with the second hole 48 aligned with the first hole 44. The flange member 6 is sandwiched between the first plate 42 and the second plate 46.

A screw 50 having a screw head 52 and a threaded shank 54 in screwed into the nut member 4 though the second hole 48 and the flange member 8. The threaded shank 54 is freely engaged thought the second hole 48 and the flange member 6. The threaded shank 54 is engaged in the bore 12 such that the thread of the threaded shank forms an internal thread into the internal surface of the bore 12 upon first screwing the screw 50.

Upon tightening the screw 50, the screw 50 pulls the nut member 4 axially towards the flange member 6. The screw 50 is tightened until the projections 32 of the blocks 22 abut the flange member 6 and the projections 32 are compressed such that the nut member 4 axially abuts the flange member 6.

When the nut member 4 is moved axially towards the flange member 6, the tabs 8 bend outwardly thus firmly engaging the teeth 20 with the edge of the first hole 44. The attachment device 2 retains the first plate 42 with respect to the second plate 46.

The attachment device 2 is locked into the first hole 44 simply by inserting the nut member 4 into the first hole 44 and thus engaging the teeth 20 on the edge of the first hole 44. Screwing of a screw further locks the attachment device 2 into the first hole 44 thus providing a reliable locking.

When engaging the screw into the nut member 4, a torque is applied onto the attachment device 2. The blocks 22 prevent rotation of the nut member 4 with respect to the first hole 44 with protecting the tabs 8 from being cut by the edge of the first plate 42 delimiting the first hole 44. Locking the nut member 4 in rotation further allows forming an internal thread of good geometry in the internal surface of the bore 12 at first screwing.

Each block 22 is offset about the axis A-A in one direction with respect to the centreline of the corresponding side face 28 and is particularly efficient for counteracting rotation of the attachment device 2 about the axis A-A in the opposite direction. In the example, in view from above (FIG. 4), each block 22 is offset about the axis A-A in the counter-clockwise direction with respect to the centreline of the side face 28 and efficiently prevents rotation of the attachment device 2 about the axis A-A in the clockwise direction.

The attachment device 2 is adapted for locking on plates of different thicknesses. The toothed tabs 8 allow locking in hole of plates of different thicknesses.

Plates may have a small thickness, smaller that the height of the axial gap between the body 10 and the flange member 6. The projections 32 account for such plates of small thickness, by providing an extra length to the abutment faces 24 towards the flange member 8, while being compressible to allow the body 10 to move and abut the flange 8 upon tightening a screw therein.

A reliable locking of the attachment device 2 is obtained with a small axial stroke of the nut member 4. The nut member 4 can be provided with sufficient length for accommodating screws without the screw protruding from the nut member 4 after tightening. This protects the operator from injury and protects other parts of the vehicle from damage during mounting operations.

The attachment device 2 is adapted for accommodating screws of different types, with different external threads.

The attachment device 2 is moulded in one piece of material, preferably of plastic material, e.g. polyamide (PA).

The attachment device 2 is obtained for example in a mold with slides. The gaps between each tab 8 and the two adjacent blocks 22 are formed with slides. The slides are thin for generating thin gaps, namely between each tab 8 and the block 22 facing the rear face 18 of the tab 8. Thin slides are fragile. The recesses 33 provided in the blocks 22 form passages allowing accommodating reinforcements of the slides. It is thus possible to manufacture the attachment device economically and reliably.

The invention claimed is:

1. An attachment device changeable between an unengaged state and an engaged state, comprising:
  a nut member comprising blocks having abutment faces defining a polygonal outline with side faces, the nut member extending along an axis and having an axial thread-engaging bore;
  a flange member extending transversely to the axis and having an opening, the flange member being spaced axially from the nut member in the unengaged state; and
  tabs connecting the flange member to the nut member in both the unengaged state and the engaged state, each tab extending alongside an abutment face on a side face and having a first end connected to the nut member and a second end connected to the flange member;
  wherein the tabs are configured to bend outwardly when the nut member is moved axially toward the flange member to change the attachment device from the unengaged state to the engaged state such that, when the attachment device in the unengaged state is inserted into a hole in a plate to be fastened, with the flange member abutting the plate at one side of the hole and the nut member extending through the hole, tightening of a threaded fastener inserted into the bore of the nut member causes axial movement of the nut member toward the flange member, thereby decreasing the distance between the first end and the second end of each tab during the change from the unengaged state to the engaged state and causing outward bending of the tabs so that the tabs engage an opposite side of the hole in the plate in the engaged state, wherein the nut member abuts the flange member in the engaged state.

2. The attachment device according to claim 1, comprising a tab on each side face.

3. The attachment device according to claim 1, wherein the abutment faces define a square outline with four side faces.

4. The attachment device according to claim 1, wherein each tab is accommodated in a cavity defined in a side face.

5. The attachment device according to claim 1, wherein each block has a lateral face facing a tab, said lateral face having a recess.

6. The attachment device according to claim 1, comprising a gap between an axial end of a body of the nut member having the bore extending therein, each block having a projection protruding axially towards the flange member beyond the axial end of the body, the abutment face of the block extending on said projection.

7. The attachment device according to claim 1, wherein the bore has a length for accommodating a threaded shank of a screw screwed in the nut member through the opening of the flange member without the threaded shank protruding from the axial end of the nut member opposite the flange member.

8. The attachment device according to claim 1, wherein each tab has a toothed front face facing outwardly.

9. The attachment device according to claim 8, wherein each tab comprises teeth of increasing height along the tab.

10. Assembly comprises a plate comprising a hole and an attachment device as in claim 1, inserted and held captive into the hole, the hole having a section corresponding to the polygonal outline defined by the abutment faces of the blocks.

11. The attachment device according to claim 1, wherein the abutted nut member and flange member limit further axial movement of the nut member toward the flange member.

12. The attachment device according to claim 11, wherein each block includes a projection that is compressed when the nut member is brought into axial abutment with the flange member.

13. An attachment device changeable between an unengaged state and an engaged state, comprising:
  a nut member extending along an axis and having an axial thread-engaging bore, wherein the nut member comprises blocks, the blocks having abutment faces defining a polygonal outline with side faces;
  a flange member extending transversely to the axis and having an opening, the flange member being spaced axially from nut member in the unengaged state; and
  tabs connecting the flange member to the nut member, each tab extending alongside an abutment face on a side face and having a first end connected to the nut member and a second end connected to the flange member;
  wherein, when the attachment device in the unengaged state is inserted into a hole in a plate to be fastened, with the flange member abutting the plate at one side of the hole and the nut member extending through the hole, the abutment faces oppose an inner wall of the hole, thereby preventing rotation of the attachment device when a threaded fastener inserted into the bore of the nut member is tightened to change the attachment device from the unengaged state to the engaged state while the attachment device is in the hole, wherein the nut member comprises four blocks and the polygonal outline is a square outline.

14. The attachment device of claim 13, wherein the blocks impart to the nut member a cross shaped cross-section with four branches.

15. An attachment device changeable between an unengaged state and an engaged state, comprising:
a nut member extending along an axis and having an axial thread-engaging bore, wherein the nut member comprises blocks, the blocks having abutment faces defining a polygonal outline with side faces;
a flange member extending transversely to the axis and having an opening, the flange member being spaced axially from nut member in the unengaged state; and
tabs connecting the flange member to the nut member, each tab extending alongside an abutment face on a side face and having a first end connected to the nut member and a second end connected to the flange member;
wherein, when the attachment device in the unengaged state is inserted into a hole in a plate to be fastened, with the flange member abutting the plate at one side of the hole and the nut member extending through the hole, the abutment faces oppose an inner wall of the hole, thereby preventing rotation of the attachment device when a threaded fastener inserted into the bore of the nut member is tightened to change the attachment device from the unengaged state to the engaged state while the attachment device is in the hole, wherein one block and one tab are located along each side face of the polygonal outline.

16. The attachment device of claim 15, wherein the one block and the one tab located along each side face are laterally offset toward different corners of the polygonal outline.

17. The attachment device of claim 16, wherein each block is laterally offset in a counter clockwise direction with respect to a centreline of the corresponding side face when viewed from an upper face of the flange facing opposite the body.

18. The attachment device of claim 15, wherein the tabs are configured to bend outwardly when the nut member is moved axially toward the flange member by the threaded fastener to change the attachment device from the unengaged state to the engaged state, thereby decreasing the distance between the first end and the second end of each tab during the change from the unengaged state to the engaged state and causing the tabs to engage an opposite side of the hole in the plate in the engaged state.

19. The attachment device of claim 15, wherein the nut member abuts the flange member in the engaged state.

* * * * *